US012780045B2

(12) United States Patent
Favaretto

(10) Patent No.: US 12,780,045 B2
(45) Date of Patent: Nov. 3, 2026

(54) ELECTRIC ROAD VEHICLE WITH SINGLE REFRIGERATED UNIT FOR BATTERY PACK AND POWER ELECTRONICS

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 318 days.

(21) Appl. No.: 18/609,143

(22) Filed: Mar. 19, 2024

(65) Prior Publication Data

US 2024/0317112 A1 Sep. 26, 2024

(30) Foreign Application Priority Data

Mar. 21, 2023 (IT) ........................ 102023000005280

(51) Int. Cl.

*B60L 58/26* (2019.01)
*B60H 1/00* (2006.01)
*B60K 1/04* (2019.01)

(52) U.S. Cl.

CPC .......... *B60L 58/26* (2019.02); *B60H 1/00278* (2013.01); *B60H 1/00392* (2013.01); *B60K 1/04* (2013.01); *B60K 2001/0405* (2013.01)

(58) Field of Classification Search

CPC ............... B60L 58/26; B60L 2240/525; B60L 2240/545; B60L 50/66; B60H 1/00278; B60H 1/00392; B60K 1/04; B60K 2001/0405; B60K 1/02; B60K 2001/005; B60K 2001/0416; B60K 1/00

See application file for complete search history.

(56) References Cited

U.S. PATENT DOCUMENTS

| | | | | |
|---|---|---|---|---|
| 9,895,981 B2 * | 2/2018 | Cimatti | ................... | B60L 50/51 |
| 10,314,210 B2 * | 6/2019 | Taguchi | ................... | B60K 1/00 |
| 10,960,836 B2 * | 3/2021 | Satake | ..................... | B60K 1/04 |
| 12,194,827 B2 * | 1/2025 | Hooton | ..................... | B60K 1/04 |
| 12,403,794 B2 * | 9/2025 | Mak | ......................... | B60K 1/00 |
| 2006/0090877 A1 | 5/2006 | Hasegawa et al. | | |
| 2020/0207424 A1 * | 7/2020 | Favaretto | ........... | B62D 25/2027 |

OTHER PUBLICATIONS

Extended European Search Report for European Patent Application No. 24164424.4, Date of Mailing: Jul. 4, 2024, 14 pages.

Italian Search Report for Application No. 202300005280; Filing Date: Mar. 21, 2023; Date of Mailing: Sep. 29, 2023; 12 pages.

* cited by examiner

*Primary Examiner* — Michael T. Walsh
(74) *Attorney, Agent, or Firm* — CANTOR COLBURN LLP

(57) ABSTRACT

Electric road vehicle comprising: a powertrain system comprising at least one first electric machine configured to control the motion of the drive wheels; a vehicular battery pack configured to power at least the first electric machine; a cooling system configured to cool at least the vehicular battery pack; power electronics circuitry, which is electrically interposed between the vehicular battery pack and the first electric machine and is configured to at least control the supply of electric power to at least the first electric machine; a refrigerated unit, which is cooled by said cooling system and comprises, in turn, a box-shaped case defining a housing, which is thermally insulated from the rest of the road vehicle and accommodates, on the inside and preferably side by side, both the vehicular battery pack and the power electronics circuitry.

15 Claims, 11 Drawing Sheets

ELECTRIC ROAD VEHICLE WITH SINGLE REFRIGERATED UNIT FOR BATTERY PACK AND POWER ELECTRONICS

CROSS-REFERENCE TO RELATED APPLICATIONS

This patent application claims priority from Italian patent application no. 102023000005280 filed on Mar. 21, 2023, the entire disclosure of which is incorporated herein by reference.

TECHNICAL FIELD

The invention relates to power storage systems for the automotive industry and it relates to a vehicular battery pack and to a relative assembling method.

In particular, the invention can advantageously, though not exclusively be applied to high-performance electric or hybrid road vehicles, to which explicit reference will be made in the description below without because of this lacking generality.

PRIOR ART

Lithium batteries, thanks to their high energy density, allow electric drive systems to be more and more implemented in the automotive industry. Lithium polymers, in particular, currently represent, from an electrochemical point of view, the state of the art in the production of high-capacity batteries.

Different types of vehicular battery packs are known, which mainly comprise cylindrical or planar (prismatic or pouch) batteries.

The battery pack of an electric vehicle needs to be cooled in order to maintain the cells within an ideal working range and reduce the deterioration thereof. In order to do so, several cooling systems using gas (for example, Freon), air or liquid (such as water or cooling liquid) were developed over the years.

Generally speaking, an electric motor vehicle typically needs electric devices that absorb or supply a significant or at least non-negligible amount of electric power, thus emanating heat during their operation.

Heat determines an increase in the temperature of the electric devices, which include the battery pack, the electric motor and possible electric power converters.

The temperature increase, if uncontrolled, can cause an overheating of the aforesaid devices, which, in turn, can cause faults or even compromise the devices themselves.

Furthermore, the temperature increase determines a drawback associated with a consequent increase in the electrical resistance of the aforesaid devices, corresponding, in turn, to a further increase in temperature and emanated heat. In other words, as the temperature increases, the concept of superconductivity that would be observed at 0° K gets farther.

Therefore, the emanated heat is usually dissipated by means of a plurality of cooling apparatuses distributed on board the road vehicle so as to cool the drives of the electric machines, the power electronics thereof and the batteries, in case high temperatures are reached. However, even though heat is correctly dissipated by said cooling apparatuses, the Joule effect determining the generation of said heat is a source of energy losses, which result in a greater consumption of energy supplied by the vehicular battery pack (hence, in a reduction of performances).

The cooling apparatuses available all over the vehicle usually comprise a refrigerator assembly, a heat exchanger and a hydraulic circuit in thermal contact with the electric devices emanating heat.

The refrigerator assembly supplies the additional heat exchanger with an evaporating fluid so as to subtract heat from the liquid flowing in the hydraulic circuit.

The liquid cooled by so doing in the area of the heat exchanger keeps flowing along the hydraulic circuit, thus reaching respective areas of exchange of heat with the electric devices distributed all over the road vehicle, where the liquid absorbs the heat emanated by the electric devices, hence lowering the temperature thereof.

Generally speaking, known cooling apparatuses need to be improved in order to cool the electric devices to a greater extent, thus decreasing the electrical resistance thereof and establishing, as a consequence, a virtuous cycle, in which the quantity of heat to be dissipated decreases, just like the waste of energy and the space needed for an effective operation of the cooling devices.

More in particular, the weight, the dimensions and the cost of known cooling devices need to be reduced, especially in high-performance vehicles, where these properties are particularly important.

An object of the invention is to fulfil at least one of the needs discussed above, preferably in a simple and reliable fashion.

DESCRIPTION OF THE INVENTION

The object of the invention is to provide a road vehicle, which is at least partially free from the drawbacks described above and, at the same time, is simple and economic to be manufactured.

According to the invention, there is provided road vehicle according to the independent claims attached hereto and, preferably, according to any one of the dependent claims directly or indirectly depending on the independent claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein.

PREFERRED EMBODIMENTS OF THE INVENTION

Figure 1:
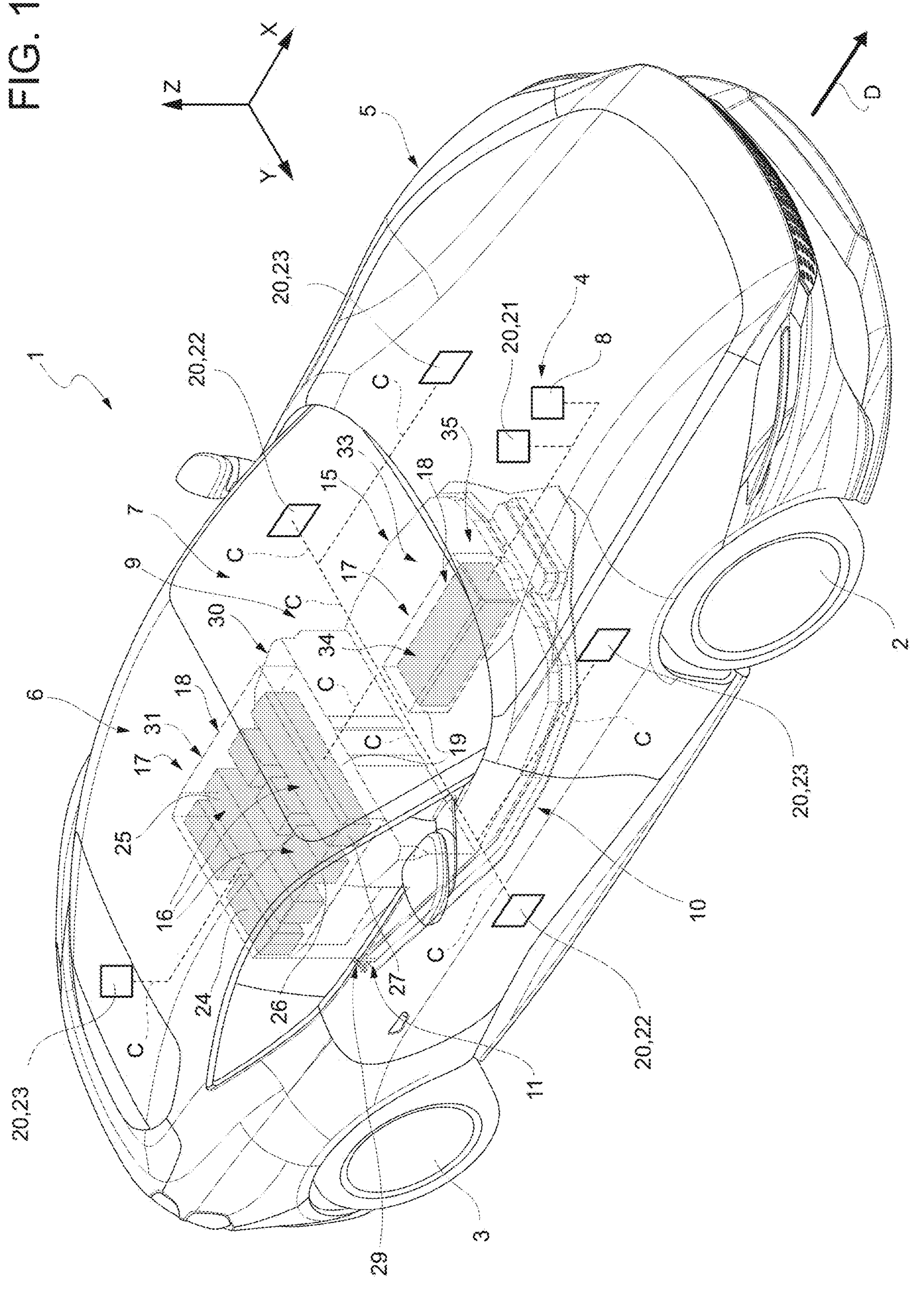
FIG. 1 is a schematic perspective view of an at least partially electric vehicle comprising a refrigerated unit according to the invention.

In FIG. 1, number 1 indicates, as a whole, a road vehicle provided with two wheels 2 and two rear wheels 3, at least a pair (or all) of them receiving the torque from a powertrain system 4.

The road vehicle 1 is an at least partially electric vehicle (in particular, a full electric vehicle). In other words, the powertrain system 4 is an electric system (namely, it solely comprises one or more electric motors).

In the figures, the same numbers and the same reference letters indicate the same elements or components with the same function.

For the purposes of the invention, the term "second" component does not imply the presence of a "first" component. As a matter of fact, these terms are only used as labels to improve clarity and should not be interpreted in a limiting manner.

The elements and features contained in the different preferred embodiments, drawings included, can be combined with one another, without for this reason going beyond the scope of protection of this patent application, as described hereinafter.

The road vehicle 1 further comprises a body 5 defining a passenger compartment 6, which is configured to accommodate at least a driver and, if necessary, one or more passengers. The passenger compartment 6 defines at least one cockpit 7 for the driver.

Hereinafter, expressions such as "at the top", "at the bottom", "at the front", "at the back" and others similar to them are used with reference to normal travel conditions of the vehicle 1 along the normal travel direction D.

As shown in the non-limiting embodiment of FIG. 1, it is further possible to define:

- a longitudinal axis X integral to the vehicle 1 and, in use, horizontal and parallel to a normal travel direction D of the vehicle 1;
- a transverse axis X integral to the vehicle 1 and, in use, horizontal and orthogonal to the axis X; and
- a vertical axis Z integral to the vehicle 1 and, in use, vertical and orthogonal to the axes X, Y.

The road vehicle 1 comprises a know vehicular frame, which is not described in detail and supports the body 5.

In particular, the powertrain system 4 comprises at least one first electric machine 8, which is configured to control the motion of the drive wheels 2, 3.

Furthermore, the road vehicle 1 comprises a vehicular battery pack 9 fitted to the frame and arranged so as to define at least part of a floorboard 10 of the road vehicle 1.

The vehicular battery pack 9 is configured to power (for example, at 400 V or 800 V) at least the first electric machine 8. In particular, the battery pack 9 powers, through power converters (for example, DC-DC power converters), a large part of, if not all the other electric utilities of the road vehicle 1.

In the non-limiting embodiments of the accompanying figures, the vehicular battery pack 9 comprises a support structure 11 extending along the vehicular longitudinal axis X and comprising a floor 12, which at least partly defines the floorboard of the road vehicle 1.

Advantageously, though not in a limiting manner, the floor 12 substantially extends between a front axle (which is known and is not shown herein) and a rear axle (which is also known and is not shown herein) of the road vehicle 1.

Figure 2:
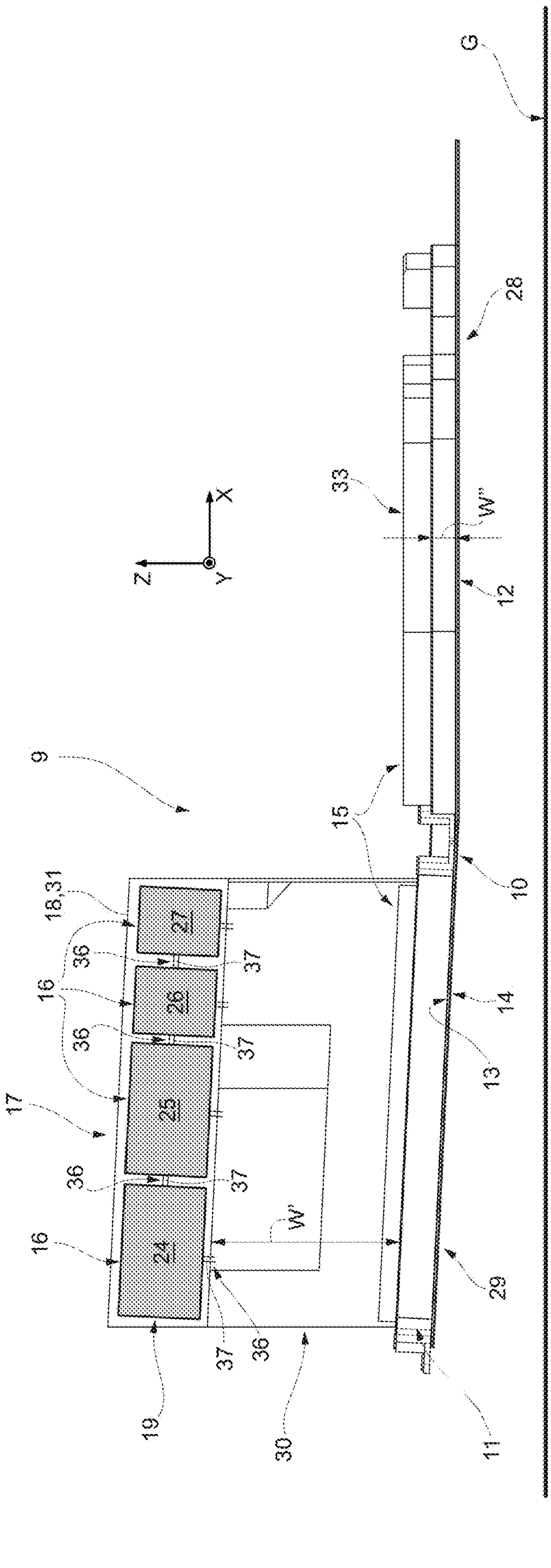
FIG. 2 is a schematic side view of a first embodiment of the refrigerated unit of FIG. 1.
Figure 3:
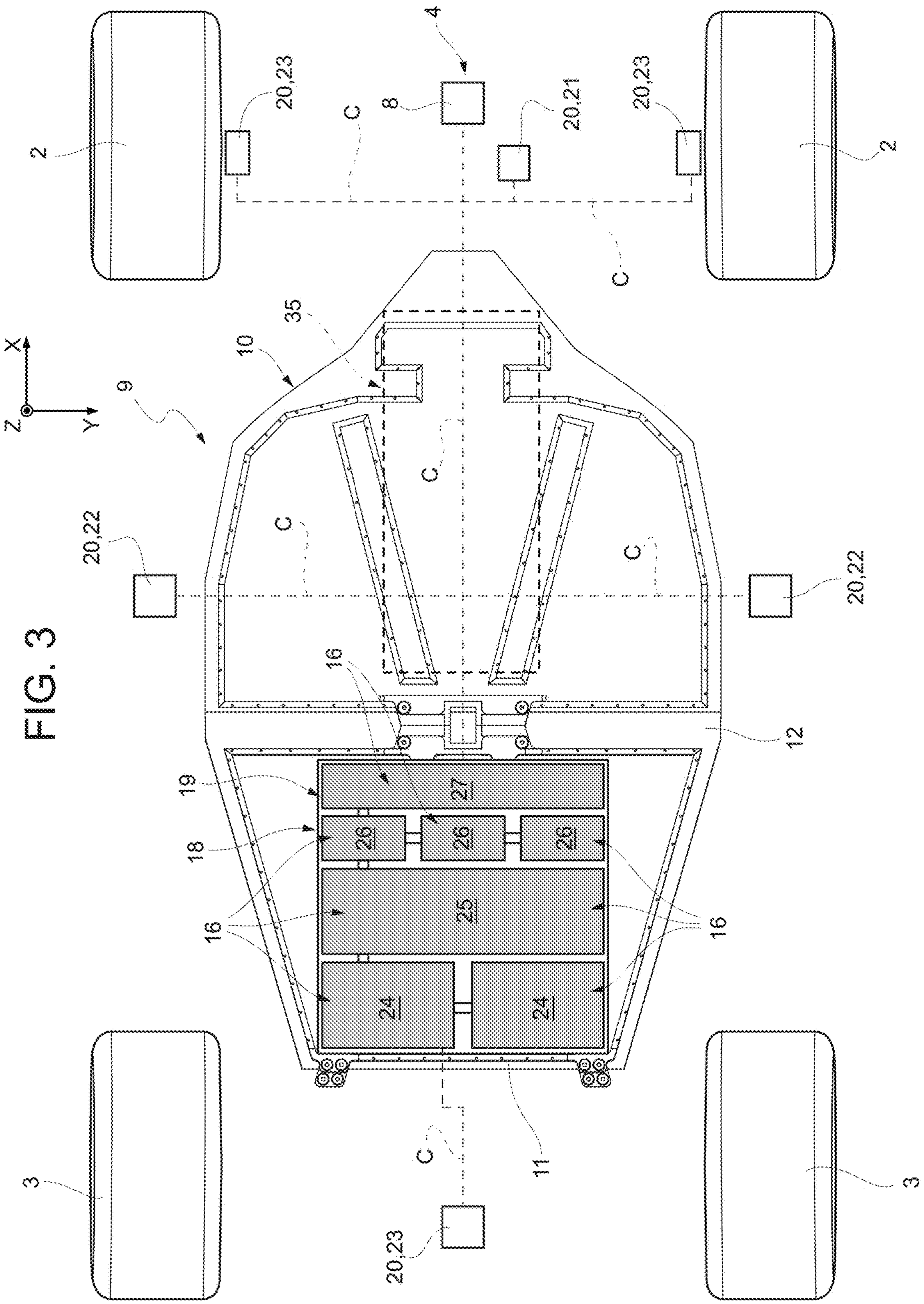
FIG. 3 is a schematic plan view of the embodiment of FIG. 2.
Figure 4:
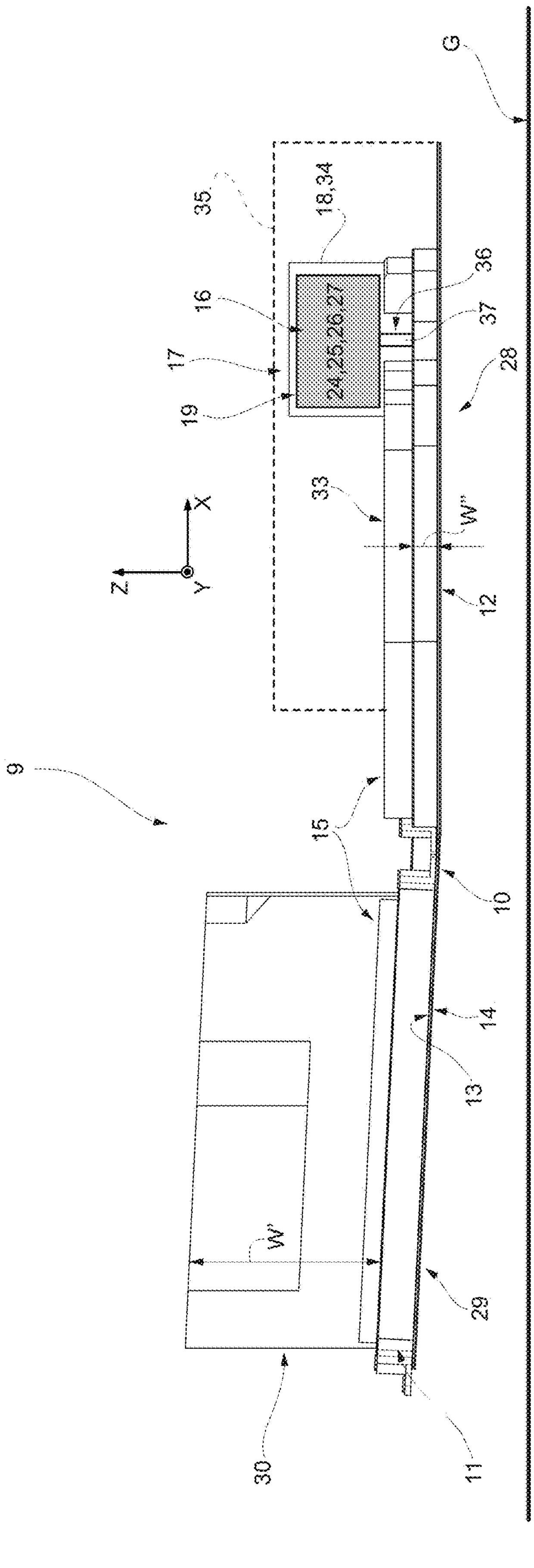
FIG. 4 is a schematic side view of a second embodiment of the refrigerated unit of FIG. 1.
Figure 5:
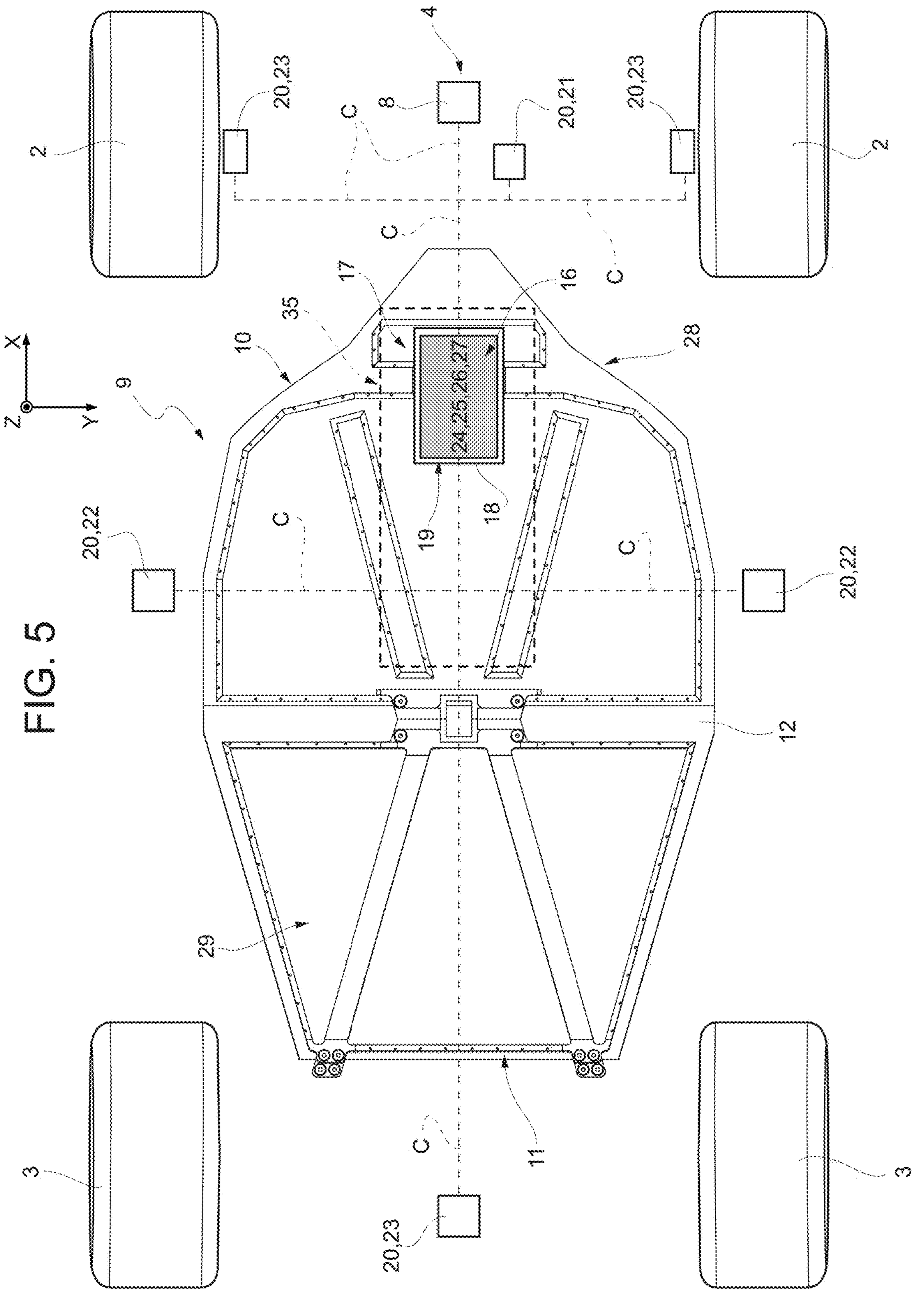
FIG. 5 is a schematic plan view of the embodiment of FIG. 4.
Figure 6:
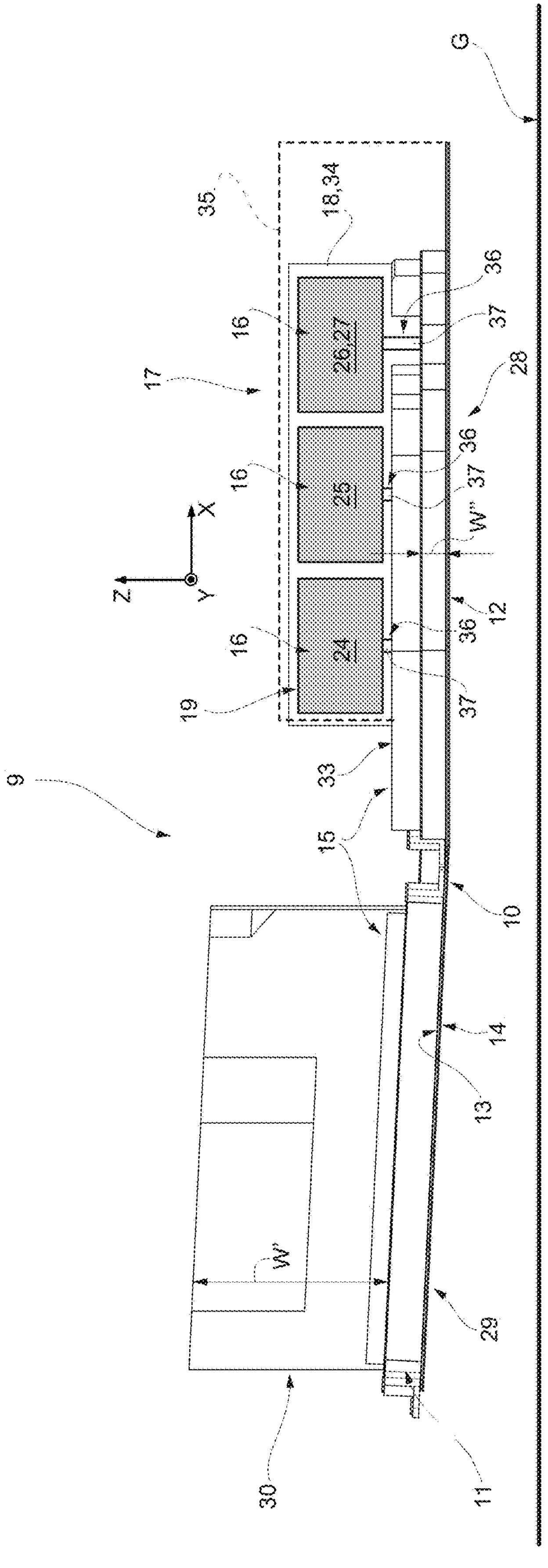
FIG. 6 is a schematic side view of a third embodiment of the refrigerated unit of FIG. 1.
Figure 7:
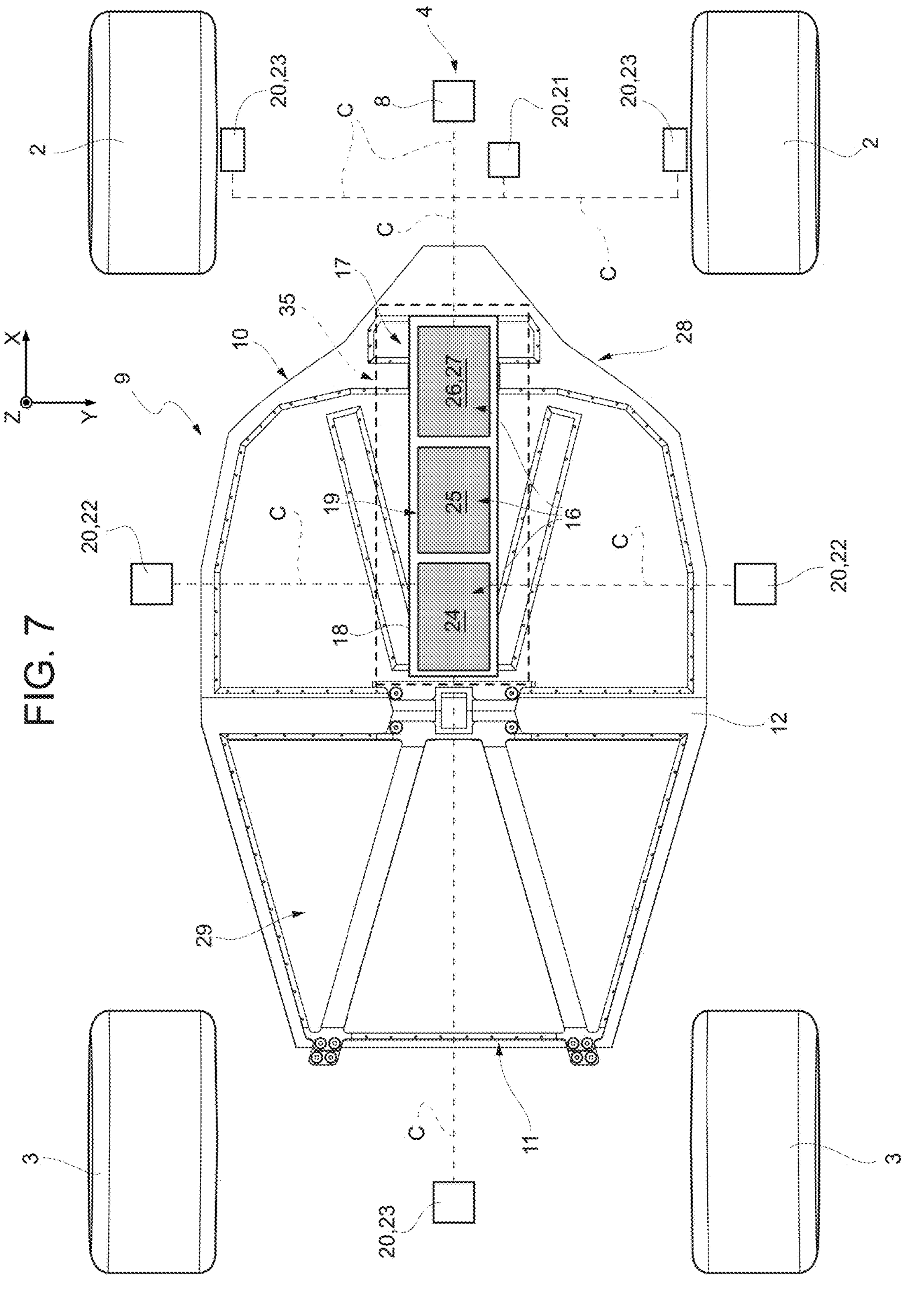
FIG. 7 is a schematic plan view of the embodiment of FIG. 6.

As shown in the non-limiting embodiments of FIGS. 2 and 3, the floor 12 has a sheet-like shape (namely, it is shaped like a slab, with a thickness that is significantly smaller than the other two dimensions) comprising an inner surface 13 and an outer surface 14, which is opposite the inner surface 13 and is configured to face outwards so as to face the ground G.

The battery pack 9 further comprises cylindrical, pouch or planar electrochemical cells of the known kind, which, therefore, will not be described in detail below, are electrically connected to one another and are arranged in the area of an outer surface 13.

In particular, though not in a limiting manner, the floor 12 has a constant thickness.

The vehicle 1 further comprises a cooling system 15 configured to cool at least the vehicular battery pack 9. The cooling system 15 can be centralized, hence, configured to generically cool the battery pack, or modular, so that each module of the battery pack is cooled by a dedicated subsystem. In this way, an ideal work temperature is ensured for the electrochemical cells of the battery pack, thus slowing down the degradation thereof and increasing their average life.

Preferably, though not in a limiting manner, the cooling system 15 involves the use of Freon, thus improving the exchange of heat.

Furthermore, the vehicle 1 comprises power electronics circuitry 16, which is electrically interposed between the vehicular battery pack 9 and the first electric machine 8 and is configured to at least control the supply of electric power to at least the first electric machine 8. Said circuitry 16 (commonly known as inverter), in use, can reach significant temperatures (up to several hundred degrees), which have to be held under control by effectively and correctly dissipating the heat generated through Joule effect. In the absence of a cooling system, indeed, the circuitry 16 is subjected to an increase in its electrical resistance and, hence, delivers a smaller power to the first electric machine 8 (since the passage of current is limited).

The vehicle 1 advantageously comprises a refrigerated unit 17, which is cooled by the cooling system 15 and comprises, in turn, a box-shaped case 18 defining a housing 19, which is thermally insulated from the rest of the road vehicle 1. In particular, the case 18 is made of a plastic (to improve or composite material the mechanical performances thereof).

"Thermally insulated" means, for the purposes of this disclosure, that the housing 19 is not affected by temperature changes on the outside of the case 18. In particular, the case 18 has a thermal conductivity of 0.3 to 3 $W \cdot m^{-1} \cdot K^{-1}$. Preferably less than 1 $W \cdot m^{-1} \cdot K^{-1}$.

Preferably, though not in a limiting manner, the case 18 is shaped so as to close itself on the battery pack 9, in particular on the edge of the floor 12.

The housing 19 advantageously accommodates, on the inside and preferably next to one another, both the vehicular and the power electronics battery pack 9 circuitry 16. Hence, in particular, since the battery pack 9 and the power electronics circuitry 16 are the main elements to be cooled on board the road vehicle 1, the refrigerated unit 17 eliminates the need for a cooling device distributed along the entire vehicle 1, which, on the contrary, is necessary in the prior art.

Advantageously, though not in a limiting manner, the road vehicle 1 further comprises one or more second electric machines 20. Therefore, the battery pack 9 is configured to also power said one or more second electric machines 20 and the power electronics circuitry (16) is electrically interposed between the vehicular battery pack 9 and said one or more second electric machines 20.

In particular, second electric machines 20 comprise an air conditioning device 21 for the passenger compartment 6 and/or one or more electric motors 22 for vehicular comfort (for example, motors for moving the windows, the seats, the wipers, active suspensions, etc.) and/or one or more electronic safety systems 23, in particular, but not only, for managing the battery pack 9 (for example, fans, fuses, brake assist systems, ABS, self-driving systems, etc.).

In some non-limiting cases, the power electronics circuitry 16 comprises one or more electric drives 24 for the first electric machine 8 and/or said one or more second electrical machines 20.

Alternatively or in addition, the power electronics circuitry 16 comprises electronic power converters 25 (for example, DC-DC converters, but not in a limiting manner).

Alternatively or in addition, the power electronics circuitry 16 comprises processors 26 or computer boards 27 (for example, video boards for support to driving or self-driving).

The aforesaid elements comprised in the circuitry 16, despite not necessarily having to be cooled during their use, would take advantage of the cooling conditions inside the unit 17, thus improving their conductivity (and reducing resistance). By so doing, therefore, said elements can be re-sized based on the new operating conditions, reducing the cross section of the electric elements and, hence, lightening the road vehicle 1, thus optimizing volumes and improving performances.

Advantageously, though not in a limiting manner, only power and/or signal wiring C branches off from the case 18 towards the first electric machine 8 and/or towards the second electric machines 20.

In some non-limiting cases, the cooling system 15 could also be used to cool air to be injected into the passenger compartment through the device 21. In this case, in addition to the wiring C, a dedicated air duct would come out of the case 18.

The term "electric machine" identifies, for the purposes of this disclosure, an electric utility, not necessarily an electric motor.

The cooling system 15 is preferably configured to maintain, on the inside of the refrigerated unit 17, a temperature below 15° C., in particular below 10° C., more in particular below 5° C. This leads to an improvement in the performances of processors and microprocessors, in particular of the electronic power converters 25 and/or of the processors 26 and/or of the computer boards 27 (for example, video boards for support to driving or self-driving).

As shown in the non-limiting embodiments of the accompanying figures, the power electronics circuitry 16 is supported by the vehicular battery pack 9, more in particular it is arranged above the vehicular battery pack 9.

In the non-limiting embodiments of the accompanying figures, the battery pack 9, in particular the floor 12, comprises, along the longitudinal axis X, a front portion 28 substantially parallel to the ground G and a rear portion 29 diverging from the ground G along a direction contrary to the normal travel direction D of the road vehicle. In particular, the portions 28 and 29 are both planar.

Advantageously, though not in a limiting manner, the box-shaped case 18 is located in the area of the front portion 28 (as shown in the embodiments of FIGS. 4 to 7). Alternatively (as shown in FIGS. 2 and 3) or in addition (as shown in FIGS. 8 to 11), the box-shaped case 18 is located in the area of the rear portion 29, thus defining one or two housings 19 for the electronic circuitry 16.

The battery pack 9 preferably comprises a verticalized portion 30 supported by the rear portion 29 and having a greater thickness W' than the rest of the battery pack 9. In particular, a first portion 31 of the housing 18 is located at the top of the verticalized portion 30.

Figure 8:
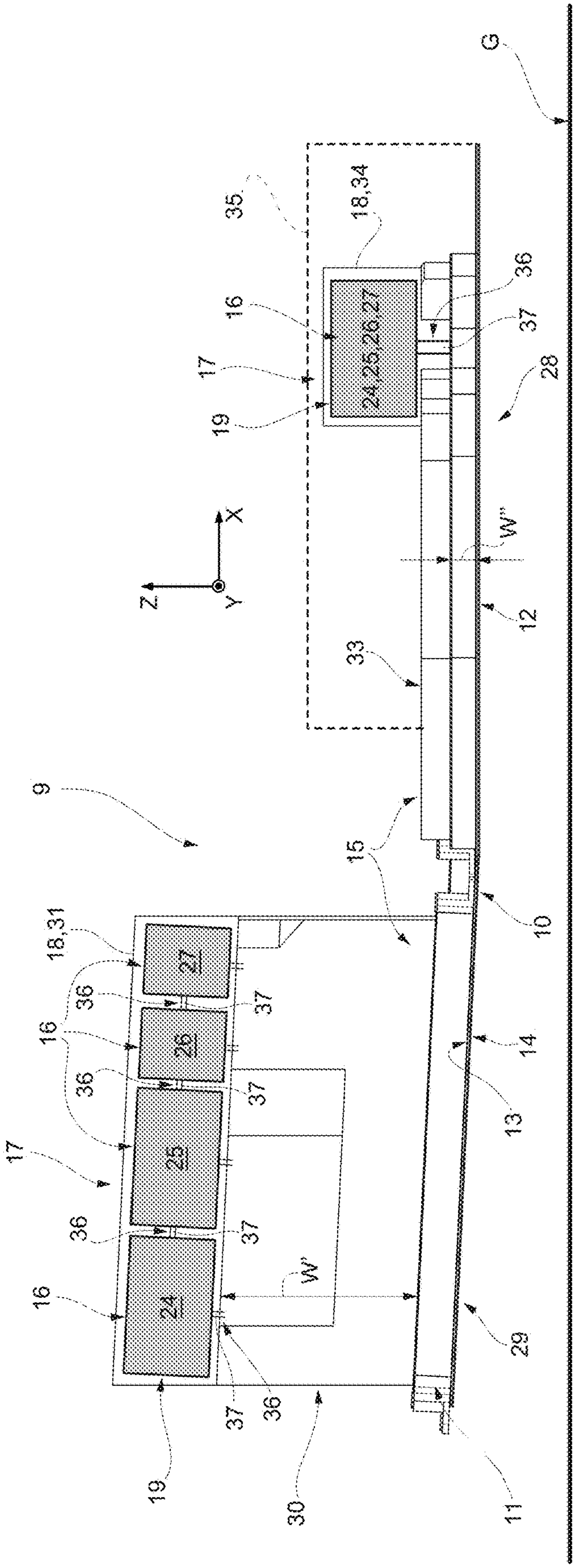
FIG. 8 is a schematic side view of a fourth embodiment of the refrigerated unit of FIG. 1.
Figure 9:
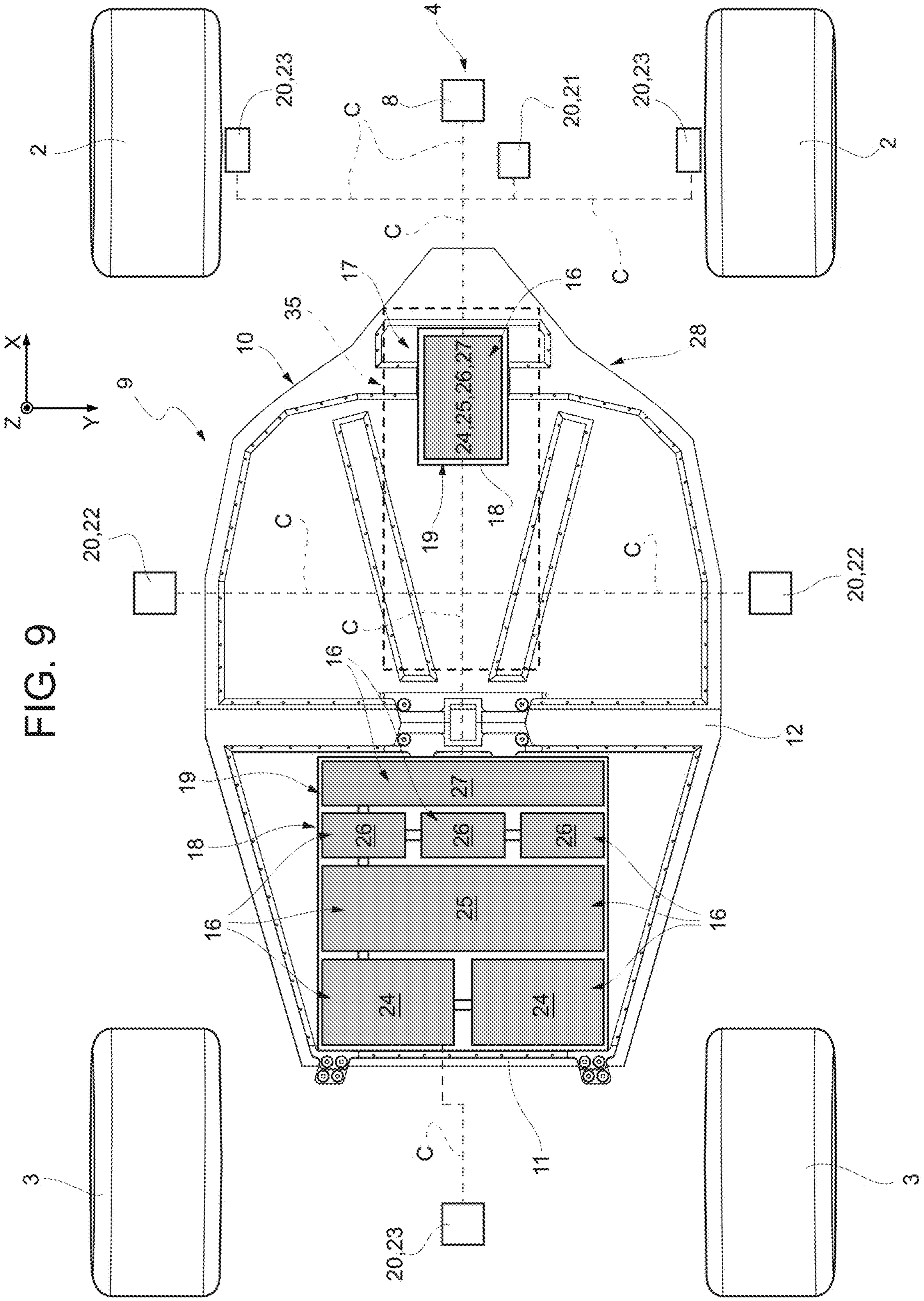
FIG. 9 is a schematic plan view of the embodiment of FIG. 8.

In the embodiments of FIGS. 2 and 3 or of FIGS. 8 and 9, the first portion 31 of the housing 18 has the shape of a parallelepiped with a rectangular base, in particular whose cross section along a vertical plane ZX (namely, the plane on which axes Z and X lie) going through the longitudinal axis X of the road vehicle 1 is a parallelogram, because of the inclination relative to the ground G of the rear portion 29, whereas it has a rectangular cross section on plane ZY (namely, the plane on which axes Z and Y lie). The vertical character of the verticalized portion 25 significantly expands the capacity of the battery pack 9.

Figure 10:
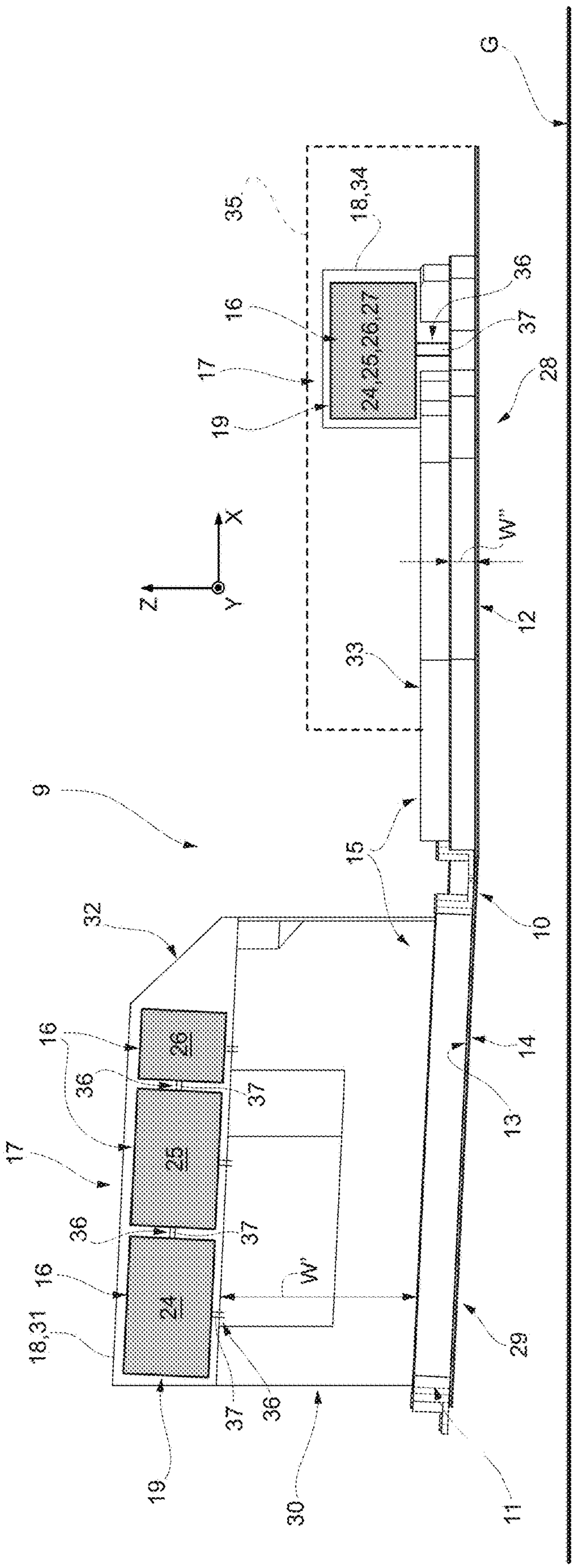
FIG. 10 is a schematic side view of a fifth embodiment of the refrigerated unit of FIG. 1, which is similar to the fourth embodiment, but features an inclined portion to facilitate the arrangement of backrests of front seats.
Figure 11:
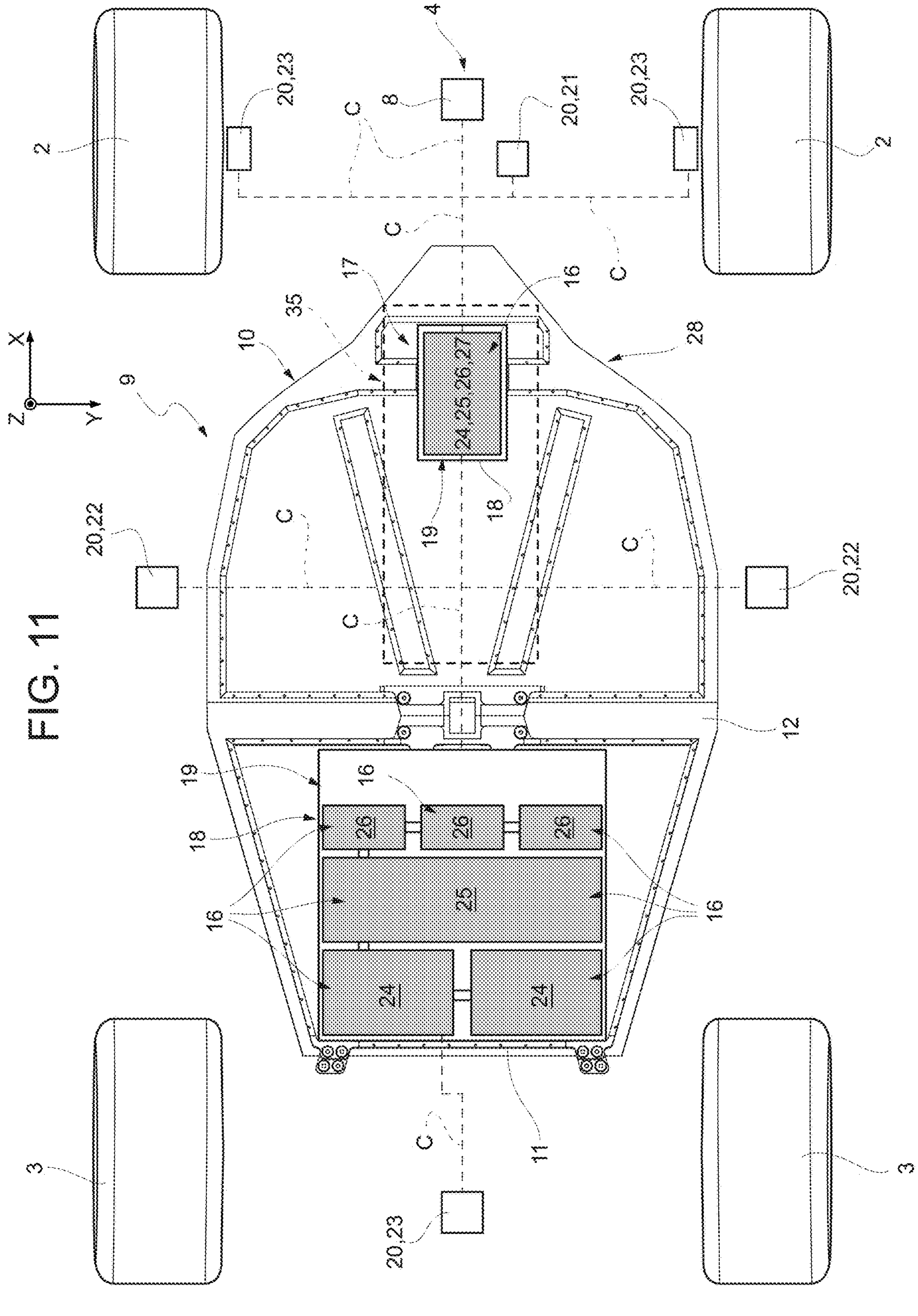
FIG. 11 is a schematic plan view of the embodiment of FIG. 10.

In the embodiment of FIGS. 10 and 11, on the contrary, the first portion 31 of the housing 18 has the shape of a parallelepiped with a rectangular base, in particular whose cross section along the vertical plane ZX going through the longitudinal axis X of the road vehicle 1 is a right-angled trapezoid having the oblique side 32 facing the passenger compartment 6 of the road vehicle 1, so as to improve the coupling to the front seats of the road vehicle 1.

Advantageously, though not necessarily, the battery pack 9 further comprises a lowered portion 33 supported by the front portion 28 and having a smaller thickness W" than the rest of the battery pack, in particular than the verticalized portion 30.

In particular, a second portion 34 of the housing 18 is located at the top of the lowered portion 33.

In the non-limiting embodiments of FIGS. 4 to 11, the second portion 34 of the housing 18 extends along the central longitudinal axis X of the road vehicle 1, under a central tunnel 35 of the road vehicle 1 (namely, the hollow longitudinal element generally interposed between the cockpit 7 and a possible passenger's seat).

Advantageously, though not in a limiting manner, the power electronics circuitry 16 is connected to (powered by) the vehicular battery pack 9 through rigid connections 36, for example direct connectors between the different elements of the circuitry 16 or between each element and the battery pack 9, or—preferably-through busbars 37. By so doing, the weight and the volume occupied, in prior art solutions, by bulky three-phase cables needed to power the electric machines 8, 20 are further reduced.

In addition, the aforesaid temperatures inside the case 18 also improve the performances of the busbars 37, thus improving the conductivity thereof.

In particular, the battery pack 9 is arranged at the bottom of the passenger compartment 6. In particular, the front portion 28 is arranged under the cockpit 7 and the possible passenger's seat beside it, whereas the rear portion 29 is arranged behind the seats contained inside the passenger compartment 6.

The battery pack 9 comprises at least one section configured to house a battery management system-BMS designed to control the operating parameters electrochemical cells.

Advantageously, though not in a limiting manner, the case 18 comprises, on the inside, a first portion and a second portion, which is different from the first portion. In particular, the first portion and the second portion are adjacent to one another.

According to some preferred, though non-limiting embodiments, the cooling system 15 is configured to keep the battery pack 9 (in the first portion) at a higher first temperature than the power electronic circuitry 16 (in the second portion, at a second temperature). In particular, this feature allows both the processors 26 and the battery pack 9 to operate at the respective ideal temperatures.

Preferably, though not in a limiting manner, the difference between the first and the second temperature is y 16 obtained by placing the power electronics circuitry closer to the cooling system 15 (for example, to cooling panels thereof located in an upper portion of the case 18) than the battery pack 9, which, for example, is arranged under the circuitry 16.

In other non-limiting cases, the battery pack 9 is kept at a higher temperature by means of suitable protective layers.

Even though the invention described above specifically relates to some precise embodiments, it should not be considered as limited to said embodiments, for its scope of protection also includes all those variants, changes or simplifications covered by the appended claims, such as for example a different shape of the battery pack, a different location thereof, a different type of materials, etc.

The invention offers many advantages.

First of all, there is no longer need for a cooling circuit running all over the road vehicle, since the refrigerated unit includes, on the inside, all the components to be cooled.

Furthermore, the invention improves cooling efficiency, by properly sizing one single local cooling system, which is already present for cooling the battery pack.

A further advantage of the invention lies in the simplicity of installation of the refrigerated unit by means of rigid connectors, which simplify the assembly thereof, reduce the possibility of errors and the quantity of material used, hence the weight.

Finally, the invention allows for a more effective cooling compared to prior art, with the consequent establishment of a virtuous cycle in which the power electronics circuitry generates less and less heat thanks to lower and lower temperatures, thus reducing the quantity of cooling fluid needed for the conditioning to a greater and greater extent, allowing for the use of smaller connectors thanks to the greater conductivity, reducing and weights and improving the management of volumes performances.

LIST OF THE REFERENCE NUMBERS OF THE FIGURES

1 vehicle
2 wheels
3 wheels
4 powertrain system
5 body
6 passenger compartment
7 cockpit
8 first electric machine
9 battery pack
10 floorboard
11 support structure
12 floor
13 inner surface
14 outer surface
15 cooling system
16 circuitry
17 refrigerated unit
18 case
19 housing
20 second electric machines
21 air conditioning device
22 electric motors
23 safety systems
24 electric drives
25 electronic converters
26 processors
27 computer boards
28 front portion
29 rear portion
30 verticalized portion
31 first portion of the housing
32 oblique side
33 lowered portion
34 second portion of the housing
35 central tunnel
36 rigid connections
37 busbars
C wiring
D direction
G ground
W' thickness
W" thickness
X axis
Y axis
Z axis

The invention claimed is:

1. Electric road vehicle (1) comprising:

four wheels (2, 3), of which at least one pair of wheels (2, 3) is driven;

a passenger compartment (6);

a powertrain system (4) comprising at least one first electrical machine (8) configured to control the motion of the drive wheels (2, 3);

a vehicular battery pack (9) configured to power at least the first electrical machine (8);

a cooling system (15) configured to cool at least the vehicular battery pack (9);

power electronics circuitry (16) which is electrically interposed between the vehicular battery pack (9) and the first electrical machine (8), and is configured to at least control the delivery of electrical power to at least the first electrical machine (8);

the road vehicle (1) being characterised by comprising a cooled unit (17), which is cooled by said cooling system (15) and comprises, in turn, a box-shaped case (18) defining a housing (19), thermally insulated from the rest of the road vehicle (1), within which are arranged, preferably side by side, both the vehicle battery pack (9) and the power electronics circuitry (16);

wherein the power electronics circuitry (16) comprises one or more electronic power converters (25) and/or processors (26) and/or computer boards (27).

2. The vehicle (1) according to claim 1 and comprising one or more second electrical machines (20), wherein the battery pack (9) is configured to also power the one or more second electrical machines (20); wherein the power electronic circuitry (16) is electrically interposed between the vehicular battery pack (9) and the one or more second electrical machines (20).

3. The vehicle (1) according to claim 2, wherein the one or more second electrical machines (20) comprise a device (21) for cabin air conditioning (6) and/or one or more electric motors (22) for vehicular comfort and/or one or more electronic safety systems (23).

4. The vehicle (1) according to claim 1, wherein the power electronics circuitry (16) comprises one or more electric drives (24) for the first and/or the one or more second electrical machines (20).

5. The vehicle (1) according to claim 1, wherein only power and/or signal wiring is branched from the casing (18) to the first electrical machine (8) and/or to the one or more second electrical machines (20).

6. The vehicle (1) according to claim 1, wherein the cooling system (15) is configured to maintain a temperature inside the refrigerated unit (17) of less than 15° C., more particularly less than 10° C., more particularly less than 5° C.

7. The vehicle (1) according to claim 1, wherein the power electronics circuitry (16) is supported by the vehicular battery pack (9) and disposed above the vehicular battery pack (9).

8. The vehicle (1) according to claim 1, wherein the vehicular battery pack (9) defines at least part of a floor pan (10) of the road vehicle (1).

9. The vehicle (1) according to claim 1, wherein the battery pack (9) comprises a front portion (28) substantially parallel to the ground and a rear portion (29) diverging from the ground; wherein the box-shaped case (18) comprises a front box-shaped case and a rear box-shaped case; the housing comprises a first housing portion and a second housing portion; the power electronics circuitry comprises a first power electronics circuitry and a second power electronics circuitry; the front box-shaped case defining the first housing portion for the first power electronic circuitry and the rear box-shaped case defining the second housing portion for the second power electronics circuitry; wherein the front box-shaped case is arranged at the front portion, and/or the rear box-shaped case is arranged as the rear portion.

10. The vehicle (1) according to claim 9, wherein the battery pack (9) comprises a verticalized portion (30) supported by the rear portion (29) and having a thickness greater than the rest of the battery pack (9), wherein a first housing portion (31) of the housing (19) is disposed on top of the verticalized portion (30).

11. The vehicle (1) according to claim 10, wherein the first housing portion (31) of the housing (19) has a parallelepiped shape, in particular whose section along a vertical plane passing through a longitudinal axis of the road vehicle (1) is a rectangular trapezoid, having the oblique side (32) facing the passenger compartment (6) of the road vehicle (1).

12. The vehicle (1) according to claim 9, wherein the battery pack (9) comprises a lowered portion (33), supported by the front portion (28) and having a lower thickness than the rest of the battery pack (9), wherein a second housing portion (34) of the housing (19) is arranged on top of the lowered portion (33).

13. The vehicle (1) according to claim 12, wherein the second housing portion (34) of the housing (19) extends along a central longitudinal axis of the road vehicle (1), below a central tunnel (35) of the road vehicle (1).

14. The vehicle (1) according to claim 1, wherein the power electronics circuitry (16) is connected to the battery pack (9) via rigid connections (36), in particular via busbars (37).

15. The vehicle (1) according to claim 1, wherein the cooling system (15) is configured to keep the battery pack (9) at higher temperature than the power electronics circuitry (16).

* * * * *